US006964934B2

(12) United States Patent
Brady et al.

(10) Patent No.: US 6,964,934 B2
(45) Date of Patent: Nov. 15, 2005

(54) PROCESS FOR THE PREPARATION OF DOPED PENTASIL-TYPE ZEOLITE USING DOPED SEEDS

(75) Inventors: Mike Brady, Studio City, CA (US); Erik Jeroen Laheij, Amstelveen (NL); Paul O'Connor, Hoevelaken (NL); Dennis Stamires, Newport Beach, CA (US)

(73) Assignee: Albemarle Netherlands B.V., Amersfoort (NL)

( * ) Notice: Subject to any disclaimer, the term of this patent is extended or adjusted under 35 U.S.C. 154(b) by 235 days.

(21) Appl. No.: 10/647,854

(22) Filed: Aug. 25, 2003

(65) Prior Publication Data

US 2004/0092386 A1 May 13, 2004

Related U.S. Application Data

(60) Provisional application No. 60/406,442, filed on Aug. 28, 2002.

(51) Int. Cl.[7] .............................................. B01J 29/06
(52) U.S. Cl. .......................... 502/66; 502/64; 502/71; 502/77; 423/709; 423/710; 423/711
(58) Field of Search ............................. 502/60, 64, 66, 502/71, 77; 423/700, 709, 710, 711

(56) References Cited

U.S. PATENT DOCUMENTS

| 3,976,598 | A | 8/1976 | Daviditz .................... 252/455 |
|---|---|---|---|
| 4,081,514 | A | 3/1978 | Sand et al. ................. 423/328 |
| 4,166,099 | A | 8/1979 | McDaniel et al. .......... 423/329 |
| 4,228,137 | A | 10/1980 | Taylor et al. ............... 423/118 |
| 4,234,457 | A | 11/1980 | Alafandi et al. ............ 252/438 |
| 4,237,031 | A | 12/1980 | Alifandi et al. ............. 252/438 |
| 4,606,900 | A | 8/1986 | Kacirek et al. ............. 423/329 |
| 5,232,675 | A | 8/1993 | Shu et al. ................... 423/328 |
| 6,667,023 | B2 * | 12/2003 | Ludvig ....................... 423/709 |
| 6,887,457 | B2 * | 5/2005 | O'Connor et al. .......... 423/709 |
| 2004/0091420 | A1 * | 5/2004 | Rao ............................ 423/709 |
| 2004/0110629 | A1 * | 6/2004 | Stamires et al. ............. 502/60 |
| 2004/0121900 | A1 * | 6/2004 | Brady et al. .................. 502/60 |

FOREIGN PATENT DOCUMENTS

| EP | 0150256 B1 | 8/1985 | ........... C01B 33/34 |
|---|---|---|---|
| EP | 0550917 B1 | 7/1993 | ........... C01B 39/36 |
| WO | 01/12551 A2 | 2/2001 | ............. C01F 7/00 |
| WO | 01/12552 A1 | 2/2001 | ............. C01F 7/02 |
| WO | 01/12554 | 2/2001 | ............. C01F 7/34 |

OTHER PUBLICATIONS

Proceedings of the 7th International Conference of Zeolites, Kasahara, et al 'Studies of Surface Science and Catalysis', 1986, pp. 185-192.
Derwent Abstract of SU1686794, dated Jan. 15, 1994.
Chemical Abstract of "Synthesis of Pentasil-Type Zeolite With Introduction of Amorphous Seeds" (1992), (2), 13-14.
International Search Report of Patent Application Serial No. PCT/EP03/09187, no date.

* cited by examiner

Primary Examiner—Christina Johnson

(57) ABSTRACT

The present invention relates to a process for the preparation of doped pentasil-type zeolite, which process comprises the steps of:
a) preparing an aqueous precursor mixture from a silicon source, an aluminium source, and doped non-zeolitic seeds; and
b) thermally treating the precursor mixture to form a doped pentasil-type zeolite.
The term "non-zeolitic seeds" includes seeds made from materials selected from the group consisting of (i) X-ray amorphous materials, (ii) milled crystalline materials, such as milled zeolites, that have a relative crystallinity of not more than 75%, and (iii) crystalline materials other than zeolites, such as clays (e,g, bentonite and kaolin) and (low) crystalline aluminas.

11 Claims, No Drawings

PROCESS FOR THE PREPARATION OF DOPED PENTASIL-TYPE ZEOLITE USING DOPED SEEDS

CROSS REFERENCE TO RELATED APPLICATION

This application claims priority from U.S. patent application Ser. No. 60/406,442, filed Aug. 28, 2002.

BACKGROUND OF THE INVENTION

1. Field of the Invention

The present invention relates to the preparation of doped pentasil-type zeolites using doped seeds.

2. Prior Art

U.S. Pat. No. 5,232,675 discloses a process for the preparation of rare earth metal (RE)-doped pentasil-type zeolites using RE-doped faujasite seeds. This process leads to the crystallisation of pentasil-type zeolite on the faujasite-type seeds. Hence, the product consists of two types of zeolites one within the other: a core of RE-doped faujasite and a shell of pentasil-type zeolite. So, the RE-ions are located in the core and not (or at least not significantly) in the pentasil-type shell. This will hinder the RE-ions from improving the activity, selectivity, and stability of the pentasil-type zeolite.

Furthermore, upon thermal treatment (e.g. during calcination, steaming, or use in an FCC unit), the RE-ions move to the very small sodalite cages of the faujasite zeolite, thereby further decreasing their influence on the activity, selectivity, and stability of the pentasil-type zeolite.

The present invention offers a process for the preparation of doped pentasil-type zeolites in which the dopant is not just located in the core.

SUMMARY OF THE INVENTION

In one embodiment, the present invention comprises the process steps of:

a) preparing an aqueous precursor mixture from a silicon source, an aluminium source, and doped non-zeolitic seeds, and b) thermally treating the precursor mixture to form a doped pentasil-type zeolite.

Other embodiments of the invention encompass details concerning precursor mixture compositions and process steps, all of which will be hereinafter discussed in detail.

DETAILED DESCRIPTION OF THE INVENTION

The process of the invention requires the use of doped non-zeolitic seeds. The term "non-zeolitic seeds" includes seeds made from materials selected from the group consisting of (a) X-ray amorphous materials—i.e. materials which are either amorphous, or containing crystallites too small to be detected by X-ray diffraction—such as an amorphous aluminosilicate nucleating gel according to, e.g., U.S. Pat. Nos. 4,606,900, 4,166,099, and Kasahara et al. in "Studies of Surface Science and Catalysis," *Proceedings of the 7th International Conference on Zeolites* 1986, pp.185–192, (b) milled crystalline materials, such as milled zeolites, that have a relative crystallinity of not more than 75%, and (c) crystalline materials other than zeolites, such as clays (e.g. bentonite, sepiolites, smectites, kaolins, etc.) and (low) crystalline aluminas.

The relative crystallinity of the milled crystalline materials according to group b) preferably is not more than 60%, more preferably not more than 55%, and most preferably not more than 50%.

The relative crystallinity of the materials is determined by Powder X-ray diffraction using copper K-alpha radiation, thereby comparing the total net integrated intensity of one or more strong reflections of the seeding material with that of the same material but having 100% crystallinity (i.e. having no amorphous phases).

For instance, the relative crystallinity of milled sodium Y-zeolite is measured by determining the total net integrated intensity of the reflections covering the interplanar spacing range of 0.62 to 0.25 nm and comparing it with the intensity of a standard sodium Y-zeolite with a crystallinity of 100%.

The term "doped non-zeolitic seeds" refers to non-zeolitic seeds containing an additive (also called dopant). Suitable additives include compounds comprising rare earth metals such as Ce or La, alkaline earth metals such as Mg, Ca, and Ba, transition metals such as Mn, Fe, Ti, Zr, Cu, Ni, Zn, Mo, W, V, and Sn, actinides, noble metals such as Pt and Pd, gallium, boron, and/or phosphorus. Suitable compounds are the oxides, hydroxides, carbonates, hydroxycarbonates, chlorides, nitrates, sulfates, and phosphates of the above elements.

The dopant is present in the doped non-zeolitic seed in amounts of 1–30 wt %, preferably 2–10 wt %, and more preferably 3–7 wt %, calculated as oxide and based on the dry weight of the doped non-zeolitic seeds.

Seeds can be doped by, e.g., ion-exchange, preparation of the seed in the presence of an additive, impregnation, or solid state exchange. For example, clay or amorphous Si—Al cogel can be ion-exchanged, resulting in a doped clay or cogel, which can serve as doped non-zeolitic seed in the process according to the invention.

A doped non-zeolitic seed according to the above definition can also be prepared by milling a doped seed (e.g. RE-Y) until its relative crystallinity is 60% or less.

Without wishing to be bound by theory, it is assumed that during the process of the invention the non-zeolitic seeds will (re-)crystallise, thereby breaking down their original structure and releasing the dopant. This in contrast to the highly ordered doped faujasite seeds according to U.S. Pat. No. 5,232,675, which retain their original structure containing the dopant.

The pentasil-type zeolite resulting from the process according to the invention preferably has a $SiO_2/Al_2O_3$ ratio of 25–90. Typical examples of pentasil-type zeolites are ZSM-type zeolites, such as ZSM-5, ZSM-5, ZSM-11, ZSM-12, ZSM-22, ZSM-23, ZSM-35, zeolite beta, or zeolite boron beta. The doped pentasil-type zeolite preferably contains 0.1–10 wt % of dopant, more preferably 0.1–3 wt %, and most preferably 0.5–2.5 wt %, calculated as oxide and based on the dry weight of the doped pentasil-type zeolite.

The first step of the process according to the invention involves the preparation of an aqueous precursor mixture comprising a silicon source, an aluminium source, and the doped non-zeolitic seeds. Preferably, the precursor mixture comprises 1–10 wt % of doped non-zeolitic seeds, based on the total solids content. More than one type of doped non-zeolitic seeds can be used in the process according to the invention.

The amount of aluminium and silicon source present in the precursor mixture depends on the desired SAR of the resulting doped pentasil-type zeolite.

It is possible for the precursor mixture to also contain an organic directing template. However, such templates are expensive and—as a result of their decomposition—environmentally harmful compounds are released upon heating of the so-prepared zeolites. Hence, it is preferred not to use a template in the process according to the invention.

Suitable aluminium sources include aluminium salts, such as $Al_2(SO_4)_3$, $AlCl_3$, $AlPO_4$, $Al_2(HPO_4)_3$, and $Al(H_2PO_4)_3$, and water-insoluble aluminium compounds, e.g. aluminium trihydrate $(Al(OH)_3)$ such as gibbsite and bauxite ore concentrate (BOC), thermally treated aluminium trihydrate such as flash-calcined aluminium trihydrate, (pseudo)boehmite, aluminium chlorohydrol, aluminium nitrohydrol. Also mixtures of one or more of these aluminium sources can be used.

Alternatively, doped aluminium sources can be used. Examples of such doped aluminium sources are doped (pseudo)boehmite, doped aluminium trihydrate, and doped flash-calcined aluminium trihydrate.

Doped aluminium sources can be prepared by preparation of the aluminium source in the presence of the dopant, impregnation of the aluminium source with the dopant, or ion-exchanging the aluminium source with the dopant.

Doped (pseudo)boehmite, for instance, can be prepared by hydrolysis of aluminium alkoxide in the presence of a dopant, hydrolysis and precipitation of aluminium salts in the presence of a dopant, or by aging a slurry of (thermally treated)aluminium trihydrate, amorphous gel alumina, or less crystalline(pseudo)boehmite in the presence of a dopant. For more information concerning the preparation of doped (pseudo)boehmite reference is made to International Patent Application Nos. WO 01/12551, WO 01/12552, and WO 01/12554.

Suitable silicon sources include sodium silicate, sodium meta-silicate, stabilised silica sols, silica gels, polysilicic acid, tetra ethylortho silicate, fumed silicas, precipitated silicas, and mixtures thereof.

Also doped silicon sources can be used. Doped silicon sources can be obtained by preparing the silicon source in the presence of the dopant, impregnating the silicon source with the dopant, or ion-exchanging the silicon source with the dopant.

Doped silica sol, for instance, can be obtained by preparing a silica sol from water glass and acid (e.g. sulfuric acid), and exchanging the sodium ions with the desired dopant. Alternatively, water glass, acid (e.g. sulfuric acid), and dopant are coprecipitated to form a doped silica sol.

Suitable dopants for the aluminium and/or the silicon source include compounds comprising rare earth metals such as Ce or La, alkaline earth metals such as Mg, Ca, and Ba, transition metals such as Zr, Mn, Fe, Ti, Zr, Cu, Ni, Zn, Mo, W, V, and Sn, actinides, noble metals such as Pt and Pd, gallium, boron and/or phosphorus. The optional dopant(s) present in the silicon and/or aluminium source and the dopant in the doped non-zeolitic seeds can be the same or different.

If so desired, several other compounds may be added to the precursor mixture, such as templates or non-doped seeds (e.g. ZSM-5 seeds, zeolite beta seeds), metal (hydr)oxides, sols, gels, pore regulating agents (sugars, surfactants), clays, metal salts, acids, bases, etc.

Furthermore, it is possible to mill the precursor mixture.

If so desired, the precursor mixture may be shaped to form shaped bodies. Suitable shaping methods include spray-drying, pelletising, extrusion (optionally combined with kneading), beading, or any other conventional shaping method used in the catalyst and absorbent fields or combinations thereof. The amount of liquid present in the precursor mixture should be adapted to the specific shaping step to be conducted. It might be advisable to partially remove the liquid used in the precursor mixture and/or add an additional or another liquid, and/or to change the pH of the precursor mixture to make the mixture gellable and thus suitable for shaping. Additives commonly used in the different shaping methods, e.g. extrusion additives, may be added to the precursor mixture used for shaping.

The second step of the process involves thermal treatment of the precursor mixture at temperatures preferably ranging from 130 to 200° C., more preferably 150–180° C., for 3–60 hrs. During this step, the doped pentasil-type zeolite is formed by crystallisation.

The thermal treatment can be conducted in one or a series of at least two reaction vessels. If more than one such vessel is used, the process is preferably conducted in a continuous mode. Using more than one reaction vessel further allows the aqueous precursor mixture to be prepared either by adding all ingredients to the first vessel, or by spreading the addition of (part of the total amount of) the ingredients over the reaction vessels.

If so desired, the resulting doped pentasil-zeolite may be calcined and optionally ion-exchanged.

The so-formed doped pentasil-type zeolite can be used in or as a catalyst composition or catalyst additive composition for, e.g. hydrogenation, dehydrogenation, catalytic cracking (FCC), and alkylation reactions.

EXAMPLES

Example 1

A 29.8 wt % aluminium sulfate solution (484 g) and a 30.3 wt % $H_2SO_4$ solution (597 g) were added to a stirred 30-litre vessel containing 3,026 g water. To this solution, 3,084 g of water glass were slowly added in 15 minutes. A gel was formed during the addition.

A first seeding slurry was prepared by milling an aqueous slurry (Loss on Ignition at 1,000° C.=27.7 wt %) of Na— and RE-exchanged zeolite Y using a KD-03 mill (bead size 1 mm). The relative crystallinity of the resulting seeds was 49%.

This relative crystallinity was determined by X-ray-diffraction using Cu K-alpha radiation. The peak areas for the sample's faujasite peaks within the scan range 14–36° 2-theta were determined using the Bruker profile fitting program Topasp. The pattern of a curved background was fitted according to the multiple background method and then substracted from the measured faujasite pattern. The so-obtained total net integrated intensity of the sample's reflections covering the interplanar spacing range of 0.62 to 0.25 nm, relative to that of a standard sodium Y-zeolite with a crystallinity of 100%, was the relative crystallinity.

A second seeding slurry (Loss on Ignition at 1,000° C.=14.1 wt %) was prepared by mixing a commercial ZSM-5 and water. The slurry was milled until the ZSM-5 had an average particle size of 0.89 $\mu$m.

104 g of the first seeding slurry were mixed with 205 g of the second seeding slurry. The resulting seeding slurry was slowly added to the aluminium sulfate/water glass mixture under vehement stirring for 10 minutes. The slurry was autoclaved for 5 hours at 170° C. and dried overnight in a stove at 120° C.

The PXRD pattern of the sample showed the formation of ZSM-5. No separate $La_2O_3$, $La(OH)_3$, or $Ce_2O_3$ phases were detected, meaning that the rare earth metal dopant was not precipitated as a separate phase.

XPS and SEM/EDAX showed that the rare earth metal was present in the entire zeolite structure; not only in its core.

Example 2

A 29.8 wt % aluminium sulfate solution (530 g) and a 30.3 wt % $H_2SO_4$ solution (616 g) were added to a stirred 30-litre vessel containing 2,879 g water. To this solution, 3,084 g of water glass were slowly added in 15 minutes. A gel was formed during the addition.

La-doped amorphous seeds were prepared by adding $La(NO_3)_3.6H_2O$ to an amorphous aluminosilicate nucleating gel. The gel was milled while diluting with water. The resulting first seeding slurry had a Loss on Ignition (LOI) at 1,000° C. of 22.1 wt %; the La-concentration was 20 wt % (calculated as $La_2O_3$ and based on the dry weight of the doped seeds after heating at 1,000° C.).

A second seeding slurry (LOI at 1,000° C.=14.1 wt %) was prepared by mixing a commercial ZSM-5 and water. The slurry was milled until the ZSM-5 had an average particle size of 0.89 μm.

152 g of the first seeding slurry were mixed with 240 g of the second seeding slurry. The resulting seeding slurry was slowly added to the aluminium sulfate/water glass mixture under vehement stirring for 10 minutes. The slurry was autoclaved for 5 hours at 170° C. and dried overnight in a stove at 120° C.

The PXRD pattern of the sample showed the formation of ZSM-5. No separate $La_2O_3$ or $La(OH)_3$ phases were detected, meaning that the La-dopant was not precipitated as a separate phase.

XPS and SEM/EDAX showed that the rare earth metal was present in the entire zeolite structure; not only in its core.

What is claimed is:

1. Process for the preparation of doped pentasil-type zeolite, which process comprises the steps of:
    a) preparing an aqueous precursor mixture from a silicon source, an aluminium source, and doped non-zeolitic seeds, and
    b) thermally treating the precursor mixture to form a doped pentasil-type zeolite.

2. The process of claim 1 wherein the doped pentasil-type zeolite is doped ZSM-5.

3. The process according of claim 1 wherein the non-zeolitic seeds are X-ray amorphous.

4. The process according of claim 1 wherein the non-zeolitic seeds are milled crystalline materials that have a relative crystallinity of not more than 75%.

5. The process of claim 4 wherein the milled crystalline materials have a relative crystallinity of not more than 60%.

6. The process of claim 5 wherein the milled crystalline materials have a relative crystallinity of not more than 50%.

7. The process of claim 1 wherein the non-zeolitic seeds are crystalline materials other than zeolites.

8. The process of claim 1 wherein the non-zeolitic seeds are doped with a dopant selected from the group consisting of Ce, La, Zr, Mn, Fe, Ti, Cu, Ni, Zn, Mo, W, V, Sn, Pt, Pd, Ga, B, and P.

9. The process of claim 1 wherein the silicon source is selected from the group consisting of sodium (meta)silicate, stabilised silica sols, silica gels, polysilicic acid, tetra ethylortho silicate, fumed silicas, precipitated silicas, and mixtures thereof.

10. The process of claim 1 wherein the aluminium source is selected from the group consisting of $Al_2(SO_4)_3$, $AlCl_3$, $AlPO_4$, $Al_2(HPO_4)_3$, $Al(H_2PO_4)_3$, aluminium trihydrate (Al(OH)$_3$), thermally treated aluminium trihydrate, (pseudo) boehmite, aluminium chlorohydrol, aluminium nitrohydrol, and mixtures thereof.

11. The process of claim 1 wherein a shaping step is performed between steps a) and b).

* * * * *